J. L. HAMILTON.
MACHINE FOR GRADING AND SORTING FRUIT.
APPLICATION FILED OCT. 19, 1910. RENEWED JAN. 8, 1912.
1,020,093.
Patented Mar. 12, 1912.
2 SHEETS—SHEET 1.
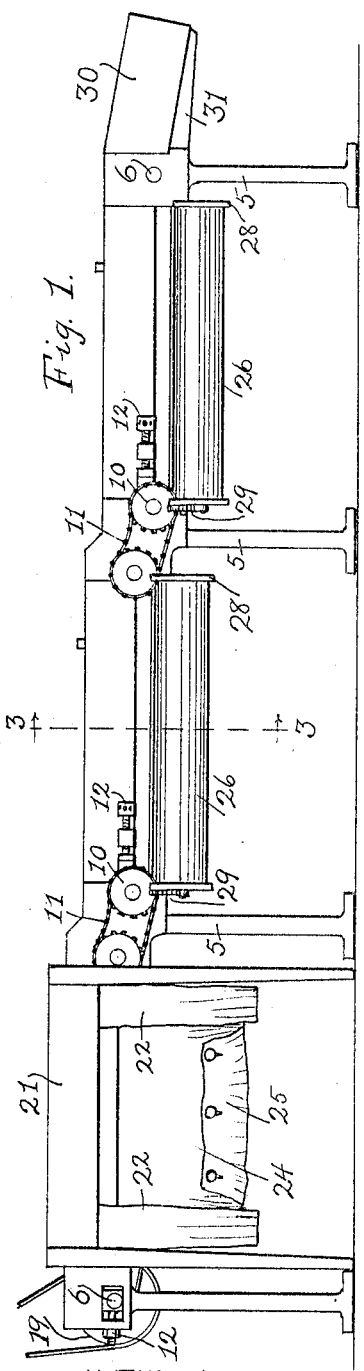
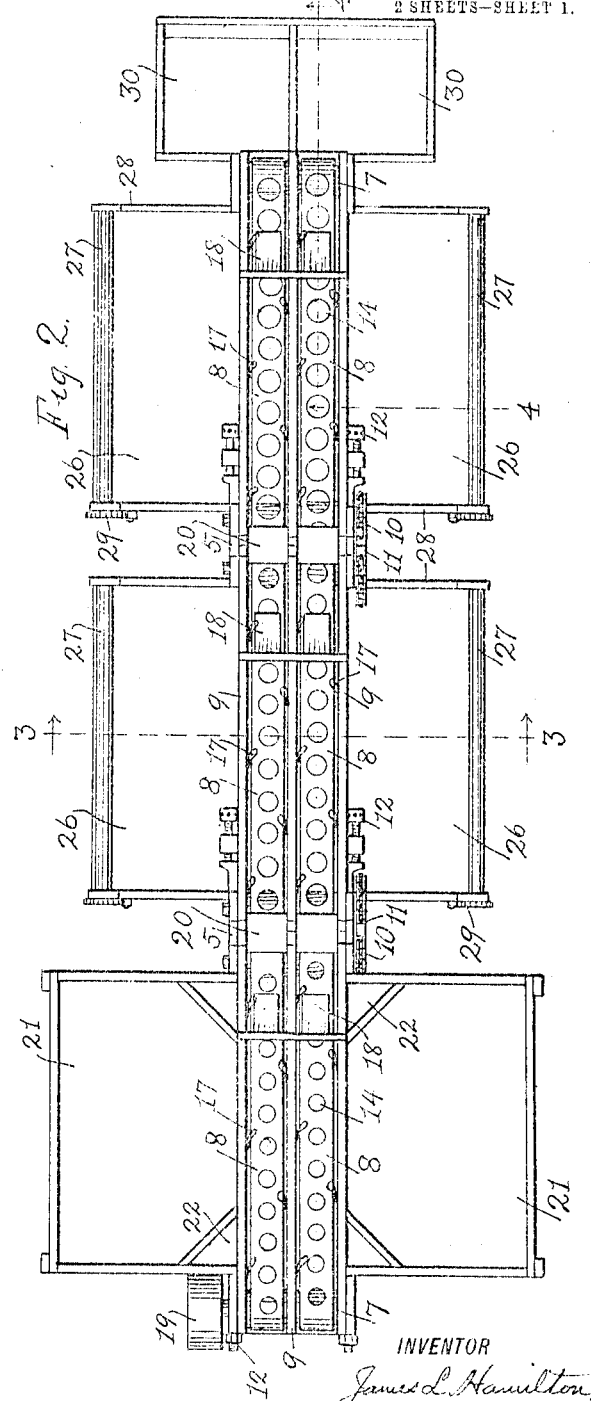
WITNESSES:
H. L. McClintock
J. K. McClintock
INVENTOR
James L. Hamilton,
BY
Frank McClintock,
ATTORNEY J. L. HAMILTON.
MACHINE FOR GRADING AND SORTING FRUIT.
APPLICATION FILED OCT. 19, 1910. RENEWED JAN. 8, 1912.
1,020,093.
Patented Mar. 12, 1912.
2 SHEETS—SHEET 2.
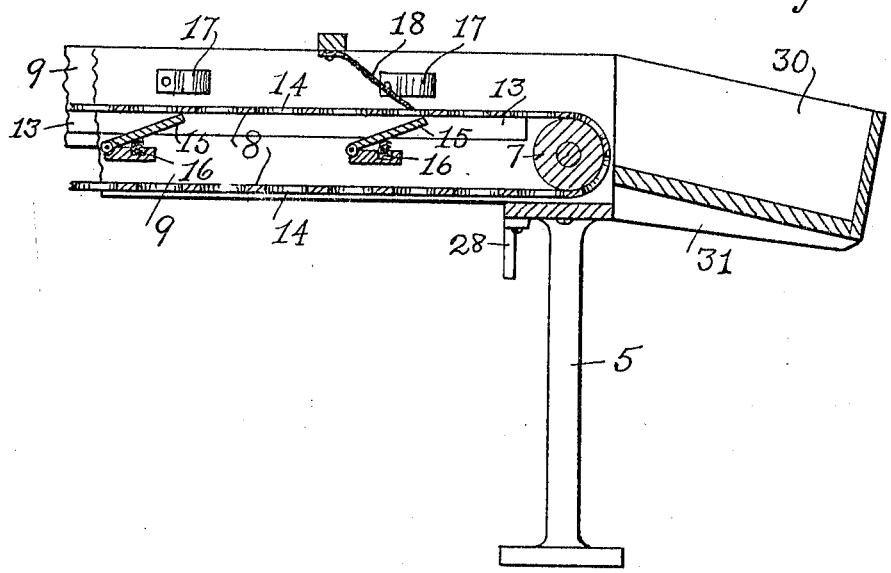
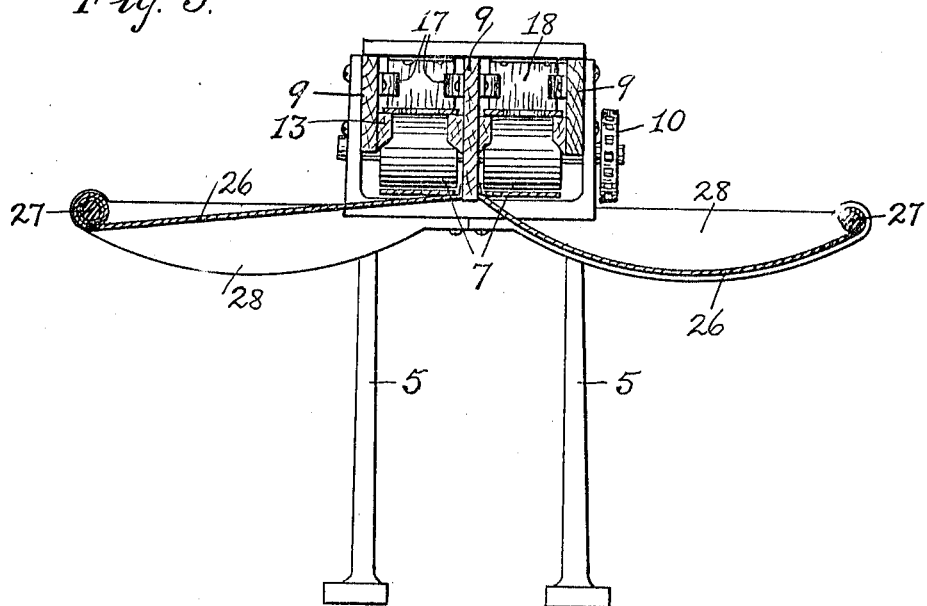
WITNESSES:
H. L. McClintock
JK. McClintock
INVENTOR
James L. Hamilton,
BY
Frank McClintock.
ATTORNEY

UNITED STATES PATENT OFFICE.

JAMES L. HAMILTON, OF GRAND JUNCTION, COLORADO.

MACHINE FOR GRADING AND SORTING FRUIT.

1,020,093. Specification of Letters Patent. Patented Mar. 12, 1912.

Application filed October 19, 1910, Serial No. 587,965. Renewed January 8, 1912. Serial No. 670,094.

*To all whom it may concern:*

Be it known that I, JAMES L. HAMILTON, a citizen of the United States, and a resident of Grand Junction, in the county of Mesa and State of Colorado, have invented certain new and useful Improvements in Machines for Grading and Sorting Fruit, of which the following is a specification.

My invention relates to improvements in machines for grading and sorting fruit, and the object of the invention is to provide a machine whereby fruit may be rapidly and accurately sorted and automatically deposited in suitable receptacles, each containing only fruit of the same grade and of substantially uniform size, so that the sorted fruit may be readily and quickly packed from such receptacles into boxes or barrels by ordinary unskilled labor, and a more uniform and regular pack secured than has usually been attained by skilled packers. I attain this object by means of the mechanism shown in the two accompanying sheets of drawings, in which—

Figure 1 is a side view of the machine complete. Fig. 2 is a plan view of the machine from above. Fig. 3 is a cross section view on an enlarged scale on the line 3—3 of Figs. 1 and 2. Fig. 4 is a longitudinal sectional view on the line 4—4 of Fig. 2.

Similar reference characters refer to similar parts in each of the several views.

The machine shown is designed especially for grading and sorting apples and is adapted to handle two grades of the fruit such as "fancy" and "choice," and sort these two grades into four different sizes, and automatically deposit all of the fruit into the proper receptacles. The machine is therefore practically a double machine, one side being used for the "fancy" fruit and the other side for the "choice" fruit.

The machine consists essentially of a series of endless carrier belts, each belt being provided with holes all uniform in size while the holes in the several successive belts increase or decrease in size by any desired unit. These belts run between guide rails which prevent the fruit from rolling off the belts. Suitable devices are provided for frequently rotating or turning the fruit, so that its smallest diameter may be presented to the hole in the belt since it is required to sort the fruit according to its minimum diameter. Suitable receptacles are provided into each of which fruit of the same size and grade is automatically deposited.

The machine is supported at a convenient height above the floor by the standards 5 which are preferably made of cast iron. The upper ends of these standards are provided with bearings 6 for the pulleys 7 on which the carrier belts 8 are placed. The guide rails 9, which are preferably made of wood, are bolted to the upper ends of the standards 5 in the manner shown. Each succeeding section of the machine is depressed below the preceding one as is clearly shown in Fig. 1. The first pulleys and carrier belts are driven by a pulley 19 by means of a driving belt which may be actuated by any desired motor power. The pulleys and carrier belts of the succeeding sections are driven by sprocket wheels 10 and chains 11. The bearings in which the pulley shafts at one end of the carrier belts run are movable and provided with adjusting screws 12 whereby the bearings may be moved longitudinally and the carrier belts may thereby be kept at the proper tension, and any stretching taken up. In order to prevent the carrier belts from sagging with the weight of fruit thereon, between the pulleys, the edges are supported by longitudinal strips 13 secured to the guide rails 9. The capacity of the machine may, it is evident, be increased to any extent desired by providing additional belts and guide walls parallel to those shown.

The carrier belts 8 are provided with numerous holes 14 the size of these holes in the several belts corresponding with the several sizes of fruit it is required to sort out for making the desired "packs." If all fruit was perfectly spherical it is evident that whenever one reached a carrier belt in which the holes were larger than itself it would immediately drop through the first hole in said belt. Since, however, all fruit is more or less irregular in shape, and it is essential to a good pack that it be sorted as to size by its minimum diameter, means must be provided whereby the fruit as it is carried along suspended within the holes may be given a sufficient number of partial rotations on its axis to insure its minimum diameter being presented to the measuring hole before passing onto the succeeding belt. This requirement is attained in this machine by means of the inclined rotators 15 which are located just below the carrier belts as clearly shown in Fig. 4. These inclined rotators are arranged to slope upward in the direction of the movement of the carrier belts, so that when an apple, which has partially entered one of the holes 14, is carried over one of said rotators by the movement of the belt it will be frictionally engaged by the rotator and thereby given a partial rotation on its axis so that another diameter will be presented to the measuring hole. By providing three of these rotators beneath each belt it has been found that a very satisfactory and perfect sorting of the fruit as to size will be secured. The inclined rotators 15 are preferably hinged and provided with light springs 16 which normally retain them in the inclined position shown. This construction allows the rotators to yield before bruising the fruit but does not in any way interfere with their normal function.

It will occasionally happen that the fruit will not at once enter one of the holes but will remain on the belt either at one side of or between two of the holes and thus be carried along on the surface of the belt and thus not be acted upon by the sorting mechanism. This difficulty will be entirely overcome and the fruit caused to enter one of the holes 14 by means of the flexible obstructing devices 17 secured to the inner walls of the guide rails 9, and the flexible aprons 18. Inclined chutes 20 are provided to allow the fruit to roll easily and without liability to be bruised from one carrier belt to the succeeding one.

Two sorting tables 21 are provided, one on each side of the first section of the machine, on which the fruit to be sorted and graded is placed. Two operatives can work at each table sorting the fruit into the grades "fancy", "choice" and "culls", this grading being determined by the surface blemishes or other defects on the fruit. The "fancy" fruit is all placed on one of the carrier belts and the "choice" fruit all on the other, while the "culls" which it is not desired to sort as to size, are dropped into the chutes 22, which guide them down into suitable boxes or other desired receptacles placed thereunder.

The fruit which drops through the smallest holes in the carrier belts of the first section, falls into a canvas sack or sacks 24, suspended with open mouths directly beneath the carrier belts. The bottom of the sack is normally closed by a flap 25. When it is desired to remove the fruit the flap 25 is unfastened whereupon the fruit will drop into a box or other receptacle.

The fruit which drops through the larger holes in the carrier belts of the second and third sections is caught by the canvas packing trays 26, the two trays on one side receiving the "fancy" grade of fruit and the two on the other side receiving the "choice" grade of fruit, which trays are preferably constructed in the manner shown. The inner edge of the canvas is secured to the lower edge of the center guide rail 9, while the outer edge is secured to a shaft 27 which may be rotated in bearings in the outer ends of the brackets 28. The rotation of the shaft 27 serves to tighten or loosen the canvas thereby varying its capacity, as may be seen in Fig. 3 where the receptacle on the right is at its maximum capacity and the one on the left at its minimum capacity. The shafts are secured at the desired point by means of rachet and pawl 29 or any equivalent device.

The largest size of the fruit is carried to the extreme right hand end of the machine where it is deposited in the receptacles 30 which are preferably constructed as shown, being substantially a partitioned box supported on brackets 31 at a small angle from horizontal so that the fruit will roll down to the outer edge convenient for the packer.

While I have shown and described what I regard as the preferred construction of my machine as adapted to the grading and sorting of apples, my invention is evidently not limited to this specific construction, since numerous mechanical modifications will readily occur. The machine may be readily adapted for sorting various other fruits and vegetables, as well as articles of various kinds which it may be desired to sort as to size, provided that additional carrier belts be provided having holes of the required size and shape. The number of sections may be increased or diminished to suit any special requirement, and also the relative arrangement of the several sections may be changed, and the sections located either one directly above another vertically or side by side horizontally, the carrier belts being arranged in such modified construction to run in alternate directions in adjoining sections.

What I claim as my invention is:—

1. In a machine for grading and sorting fruit the combination of an endless perforated carrier belt, parallel guide walls for supporting said belt, and retaining the fruit thereon, means for moving said belt between the guide walls, and means for rotating the fruit within the holes while being carried along on said belt.

2. In a machine for grading and sorting fruit the combination of an endless perforated carrier belt, parallel guide walls for supporting said belt and retaining the fruit thereon, means for moving said belt between the guide walls, inclined rotators underneath said belt and flexible obstructing devices located along the side walls, rotating and guiding the fruit while being carried along on said belt.

3. In a machine for grading and sorting fruit the combination of a plurality of endless perforated carrier belts, each belt having all of its perforations uniform in size and the perforations in each successive belt increasing in size by a desired unit, parallel guide walls for supporting said belts and retaining the fruit thereon, means for moving said belts between the guide walls, and means for rotating the fruit within the holes while being carried along on said belts.

4. In a machine for grading and sorting fruit the combination of an endless perforated carrier belt, parallel guide walls for supporting said belt and retaining the fruit thereon, means for moving said belt between the guide walls, hinged rotators normally inclined upward to the belt and adapted to turn the fruit when suspended in the perforation while being carried along on said belt.

5. In a machine for grading and sorting fruit the combination of a plurality of endless perforated carrier belts each belt having all of its perforations uniform in size, and the perforations in each successive belt increasing in size by a desired unit, parallel guide walls for supporting said belts and retaining the fruit thereon, means for moving said belt between the guide walls, means for rotating the fruit within the holes while being carried along on said belts, and suitable receptacles adapted to receive the several grades and sizes of the fruit.

Signed at Grand Junction in the county of Mesa and State of Colorado this 12th day of October, A. D. 1910.

JAMES L. HAMILTON.

Witnesses:
J. K. McCLINTOCK,
H. L. McCLINTOCK.